United States Patent
Jaquier

(10) Patent No.: US 7,380,133 B2
(45) Date of Patent: May 27, 2008

(54) ANTI-CLONING METHOD

(75) Inventor: Jean-Luc Jaquier, La Conversion (CH)

(73) Assignee: Nagravision S.A., Cheseaux-Sur-Lausanne (CH)

( * ) Notice: Subject to any disclaimer, the term of this patent is extended or adjusted under 35 U.S.C. 154(b) by 859 days.

(21) Appl. No.: 10/297,432

(22) PCT Filed: Dec. 21, 2001

(86) PCT No.: PCT/IB01/02712

§ 371 (c)(1),
(2), (4) Date: Dec. 6, 2002

(87) PCT Pub. No.: WO02/052389

PCT Pub. Date: Jul. 4, 2002

(65) Prior Publication Data

US 2003/0135747 A1    Jul. 17, 2003

(30) Foreign Application Priority Data

Dec. 22, 2000  (CH) ................................ 2519/00
Jan. 26, 2001  (CH) ................................ 0137/01

(51) Int. Cl.
*G06F 7/04*    (2006.01)
*H04L 9/32*    (2006.01)
*H04L 9/00*    (2006.01)
*G06K 19/00*   (2006.01)
*G08B 23/00*   (2006.01)

(52) U.S. Cl. .............................. 713/193; 726/4; 726/6; 726/17; 726/21; 726/23; 713/185

(58) Field of Classification Search .................. 726/4, 726/6, 17, 21, 23; 713/185
See application file for complete search history.

(56) References Cited

U.S. PATENT DOCUMENTS

| 4,672,533 | A |   | 6/1987  | Noble et al. |
|-----------|---|---|---------|--------------|
| 5,237,610 | A | * | 8/1993  | Gammie et al. ............. 380/228 |
| 5,365,587 | A | * | 11/1994 | Campbell et al. ............ 713/183 |
| 5,664,017 | A | * | 9/1997  | Gressel et al. ................. 380/30 |
| 5,748,737 | A | * | 5/1998  | Daggar ........................ 705/41 |
| 5,937,068 | A | * | 8/1999  | Audebert ..................... 713/185 |
| 6,072,870 | A | * | 6/2000  | Nguyen et al. ................ 705/79 |
| 6,253,027 | B1 | * | 6/2001 | Weber et al. ................ 380/287 |

(Continued)

FOREIGN PATENT DOCUMENTS

EP       0 836 160        4/1998

(Continued)

*Primary Examiner*—Nasser Moazzami
*Assistant Examiner*—Chinwendu C Okoronkwo
(74) *Attorney, Agent, or Firm*—DLA Piper US LLP

(57) ABSTRACT

The objective of the present invention is to propose a method that allows preventing the use of more than one identical security module for the identification and use of resources administered by an operating centre. This objective is achieved by an anti-cloning method based on the memorization of the identification numbers of the user units connected to said security module.

During a connection with an operating centre these numbers are transmitted and compared with the numbers of a previous transmission. Differences are accepted as long as new numbers are added to a list previously transmitted. The security module is declared invalid if the numbers previously memorized are not included in the transmitted numbers.

10 Claims, 1 Drawing Sheet

| C-3 | A |
|-----|---|
| C-2 | B |
| C-1 | C |
| Cn  | D |

U.S. PATENT DOCUMENTS

2003/0135471 A1    7/2003    Jaquier et al.
2006/0059544 A1*   3/2006    Gutherie et al. ............... 726/4

FOREIGN PATENT DOCUMENTS

| FR | 2 681 165 | 3/1993 |
| FR | 2 762 118 | 10/1998 |
| WO | WO 96 25814 | 8/1996 |
| WO | WO 00 38035 | 6/2000 |

* cited by examiner

| C-3 | A |
|-----|---|
| C-2 | B |
| C-1 | C |
| Cn  | D |

Fig. 1

| C-5 | A |
|-----|---|
| C-4 | B |
| C-3 | C |
| C-2 | D |
| C-1 | E |
| Cn  | F |

Fig. 2

| C-4 | A |
|-----|---|
| C-3 | B |
| C-2 | C |
| C-1 | D |
| Cn  | K |

Fig. 3

ANTI-CLONING METHOD

FIELD OF THE INVENTION

The present invention concerns a method for detecting a duplication of a security module, particularly during the interaction of this security module with several user units.

BACKGROUND

User units are connected to one or several networks offering products or services for sale. These products or services are subject to a conditional use, or control. For this reason, these units have a security module in charge of the identification and management of the access authorization to said networks.

These user units may take several forms, for example a pay-television decoder, a computer, a mobile phone, a palmtop, a PDA, a radio, a television, a multimedia station, or an automatic teller machine.

This security module is generally in the form of a smart card, a credit card or a SIM card, usually including a cryptographic processor. This card supplies the necessary information for identifying itself on a network by means of decryption operations using keys stored in the memory of the cryptographic processor, which is reputed be inviolable.

This security module can be in charge of exchanging confidential information with the user unit, for example when producing the key that starts the cryptographic operations associated to the identification or the payment of a product.

These security modules can be connected to several user units according to the user's needs. Such a use is allowed by the administrator of the network, and this is why the security module is generally moveable. This situation is found in the field of pay television or that of mobile phones.

Due to the value that this security module represents, particularly in electronic purse applications, the temptation is great for pirates to clone these modules.

Although the operating center is able to detect the simultaneous use of two modules having the same serial number, if this use is done at different moments it is not possible for the operating center to determine if the use is by the same module or by a clone.

A first solution is described in U.S. Pat. No. 4,672,533 and proposes to create session number that must change with each connection with the operating center. It is a previous identification to all transactions and although it answers the need to detect copies of the cards it can only function in an environment in which the on-line connection with the operating center is obligatory.

SUMMARY OF THE INVENTION

The objective of the present invention is to propose a method that allows preventing the use of more than one identical security module for the identification and use of resources administered by at least one operating center.

This objective is achieved by an anti-cloning control method for a security module comprising at least one unique identification number destined to be connected to a user unit comprising at least one unique identification number, the user unit being connectable to an operating center, the method comprising the steps of:

collecting by the security module the unique identification number of each user unit to which said module is connected, transmitting, upon request by the operating center, the unique identification number of the security module and the unique identification numbers specific to the user units previously connected to this security module, comparing by the operating center these user unit identification numbers with a list previously memorized during the last connection with said center, authorizing said security module if the list transmitted by the user unit in the transmitting step corresponds with the list previously memorized, if not authorizing this security module provided that the unknown user unit identification numbers follow the list previously memorized.

In this way the control of validity of the security module is not only based on the static data but also integrates a variable data that retraces the different user units that are used.

Thanks to this method a security module copied integrally differs from the original from its first use with a user unit.

BRIEF DESCRIPTION OF THE DRAWINGS

A more thorough understanding of the many features and advantages of the present invention will be obtained with reference to the following detailed description and accompanying drawings in which:

FIG. 1 is a schematic diagram of a memory zone of a valid security module at a first point in time according to an embodiment of the invention.

FIG. 2 is a schematic diagram of the memory zone of FIG. 1 in a valid security module at a second point in time.

FIG. 3 is a schematic diagram of the memory zone of FIG. 1 in a pirated security module at a third point in time.

DETAILED DESCRIPTION

Let us take for example a security module A that contains unique numbers i, j, k. During this first use, the memory zone of the security module will store the unique number 1 of the user unit U1. The original security unit will then contain the image i, j, k, 1. A clone of this security module A (made before the first use described above) connected to a unit Up will contain the image i, j, k, p.

The first security module that will be connected to the operating center by the user unit will transmit its information, for example i, j, k, 1. If the clone module is equally connected, the image of the units connected to this module will necessarily contain i, j, k, 1. In our case the member I is absent and indicates that this module is not the one previously connected. The clone is thus detected.

According to the chosen control protocol, the operating center, in case it detects such a module, can declare this security module invalid, blocking the use of the true module for the same occasion.

According to an embodiment of the invention, it is sufficient to memorize two unique numbers to obtain the desired objective, that is, the number of the current user unit and the number of the previous user unit. When the security module is moved to another user unit the current number becomes the previous number, the user unit number becoming the new current number.

Thanks to this method a security module can immediately become operational with a user unit without demanding an authorization by an operating center. A link with the operating center can be carried out every n transactions, according to the duration of use, randomly, or on request of the operating center. If the memory of the security module is full, a demand can be made that a connection be carried out with the operating center before liberating space in the memory.

This invention can thus cover the case where a user unit would function without a link with an operating center. This can be the case of pay terminals limited to small amounts or of access to services such as pay television or the reception of digital radio (DAB) for example. In this case the speed of availability is an asset to convince the user of using this type of services and it is acceptable to carry out only sporadic controls. When the user connects a ticket distributor which has a on-line communication with the center, the verification is done at that moment.

This configuration will be advantageously described by FIGS. 1 to 3 that represent the memory zone of a security module.

Let us take for example FIG. 1, of a module N comprising two zones, one for the number of the current user unit Cn, the other for the previous terminal number C-1.

In the module N is the user unit number C in the previous zone C-1 and the user unit number D in the current zone Cn.

Let us take for example a connection of this security module to a first user unit E and then a second unit F. The memory of the module will contain the identification numbers such as illustrated by FIG. 2. The current zone Cn contains the user identification F.

During a connection with an operating center these numbers A to F are transmitted and memorized in the center for control. The previous memorized image contained the identification numbers A to D and there is then the identity between the memorized image and a part of the transmitted numbers.

It should be noted that according to the invention it is not necessary to connect with the operating center with each new connection with the user unit. The control can be carried out sporadically, randomly, or upon demand of the operating center.

A module that has been cloned in the state of FIG. 1 or with the numbers A to D and that has been connected to a user unit K presents a memory zone such as illustrated in FIG. 3.

When this information A to D, K is transmitted to the operating center the member K is unknown and does not follow the previous image which is the user identification F. The operating center can then deduct that there are two security modules with the same single number.

According to a simplified embodiment of the invention, it is not necessary to keep the user identification numbers after a positive control. Only the last numbers are kept as a trace of the previous connections with the user units. By "last" we mean, for example, the last two or three.

From this fact it will be enough that in the subsequently transmitted numbers we find these last numbers to follow the trace of this module.

According to our previous example, once the module of FIG. 1 is accepted by the operating center, the numbers A, B are erased from the memory zone of the module, leaving only C, D.

This module is then connected to a unit E and then a unit F. These data C, D, E, F are transmitted to the operating center for verification. The values C, D being present in the data previously memorized, the module is considered as valid and the user identifications E, F are erased.

In the case of FIG. 3 the cloned module is connected to the unit K that will transmit these data A, B, C, D, K to the operating center. The latter looks for the presence of E, F according to the last connection, and from the fact that these user identifications are not present in the transmitted data, the center can detect the presence of a falsified security module.

According to one embodiment, the data exchanged between the security module and the user unit are encrypted by a pairing key, that is, a key specific to the couple security module/user unit. This key can by of several types, a secret symmetrical key or an asymmetrical key (public key, private key). Following the nature of the key it is possible to use this key as a single user identification such as described above to identify the user unit. In this case it is not the user unit in time as such that is identified but the pair formed by the security module and the user unit.

It is then possible to transmit all or part of this pairing key as a user identification. In fact for the identification operations it is possible to use a part of this key, particularly if we wish that this key is not divulged. According to a particular embodiment it is a key pair public key/private key that is used as a pairing key (asymmetrical keys) and it is the public key that is used as a user identification.

The invention claimed is:

1. A method for preventing authorization of a cloned security module comprising the steps of:
  receiving at an operating center a request for authorization from a security module, the request including an identification number of the security module;
  receiving at the operating center a first list from the security module, the first list including at least one unique identification number corresponding to at least one user unit to which the security module has been previously connected;
  comparing at the operating center the first list to a second list including at least one unique identification number corresponding to at least one user unit, the second list having been reported by a security module with an identical identification number; and
  denying the request if any unique identification number on the second list is not on the first list.

2. The method of claim 1, further comprising the step of:
  preventing further use of any security module having an identification number the same as the identification number included in the request for authorization.

3. The method of claim 1, wherein the first list contains only the user unit to which the security module has most recently been connected.

4. The method of claim 1, wherein the identification number of the security module is formed by all or part of a pairing key used to encrypt data exchanged between the security module and the user unit.

5. The method of claim 4, wherein the pairing key is asymmetric and the identification number of the security module is formed by the public key.

6. A security module adapted to facilitate the detection of a clone, the security module comprising:
  a memory, the memory having stored therein at least one identification number of the security module;
  a processor, the processor being configured to perform the steps of:
    sending a request for authorization to an operating center, the request including the identification number of the security module;
    sending a list to the operating center, the list including at least one identification number of a user unit to which the security module has previously been connected; and storing an identification number of a user unit to which the security module is currently connected in the memory, whereby the list sent by the security module is suitable for comparison against a previously reported list of identification numbers of user units to detest the existence of a closed security module.

7. The security module of claim 6, wherein the processor is further configured to perform the step of deleting any stored identification numbers of user units other than a user unit to which the security module is currently connected if the authorization is received.

8. A system comprising:

a user unit;

a security module connected to the user unit; and an operating center;

wherein the security module is configured to perform the steps of:

sending a request for authorization to an operating center, the request including the identification number of the security module, sending a list to the operating center, the list including at least one identification number of a user unit to which the security module has previously been connected;

receiving the request and the list from the security module; and comparing the list received from the security module to a second list, the second list having been previously received by the operating center from a security module with an identification number identified to the identification number in the request, and denying the request if any unique identification number on the second list is not on the first list.

9. The system of claim 8, wherein the security module is a smart card.

10. The system of claim 8, wherein the security module is a SIM card.

* * * * *